Sept. 21, 1971  B. G. VERBICK  3,606,842
ADJUSTABLE RETAINER
Filed May 5, 1969  4 Sheets-Sheet 1

Inventor
BASIL GEORGE VERBICK
BY
Irving Faber
ATTYS.

Sept. 21, 1971     B. G. VERBICK     3,606,842
ADJUSTABLE RETAINER
Filed May 5, 1969     4 Sheets-Sheet 2
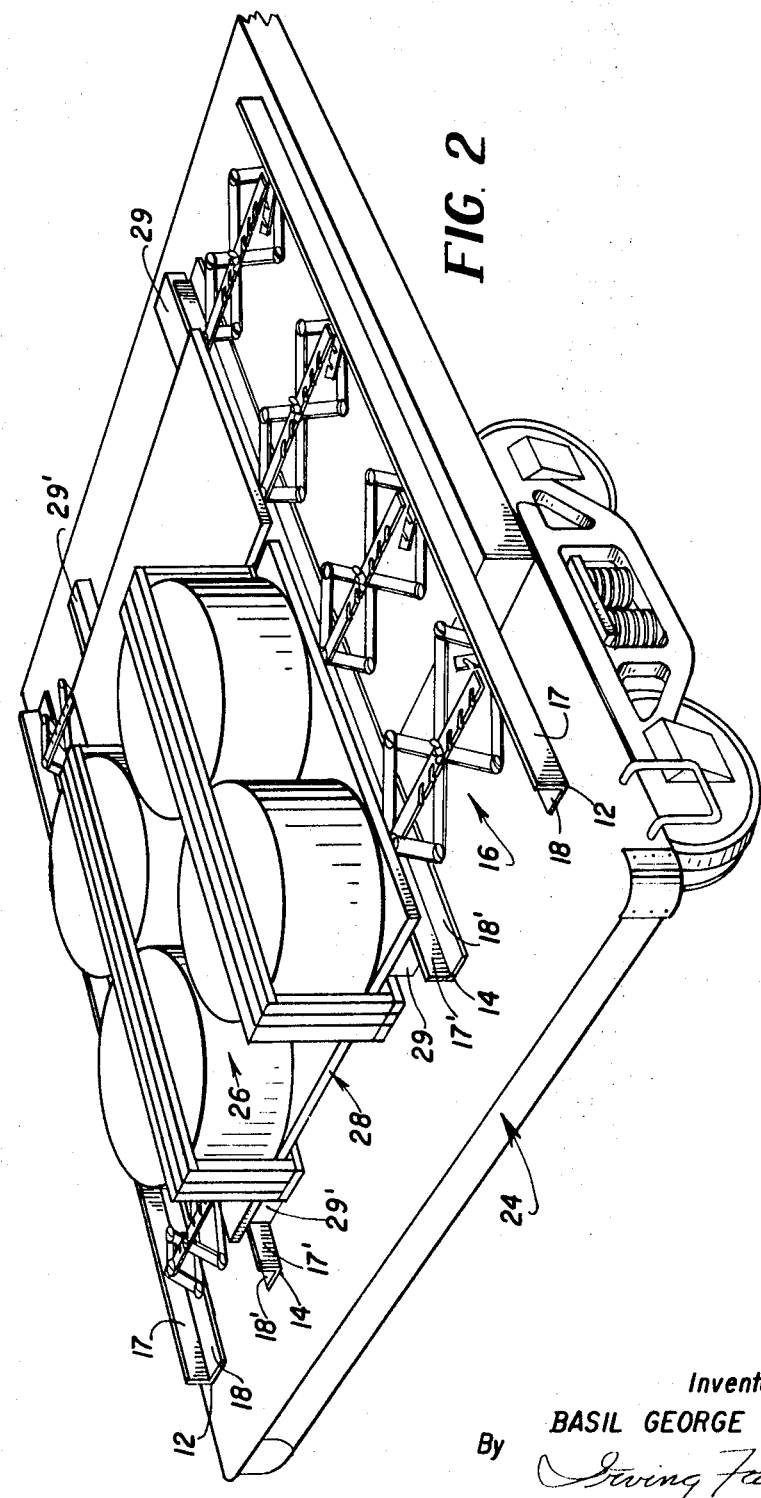
*Inventor*
BASIL GEORGE VERBICK
By Irving Faber
ATTYS.

Sept. 21, 1971     B. G. VERBICK     3,606,842
ADJUSTABLE RETAINER
Filed May 5, 1969     4 Sheets-Sheet 3
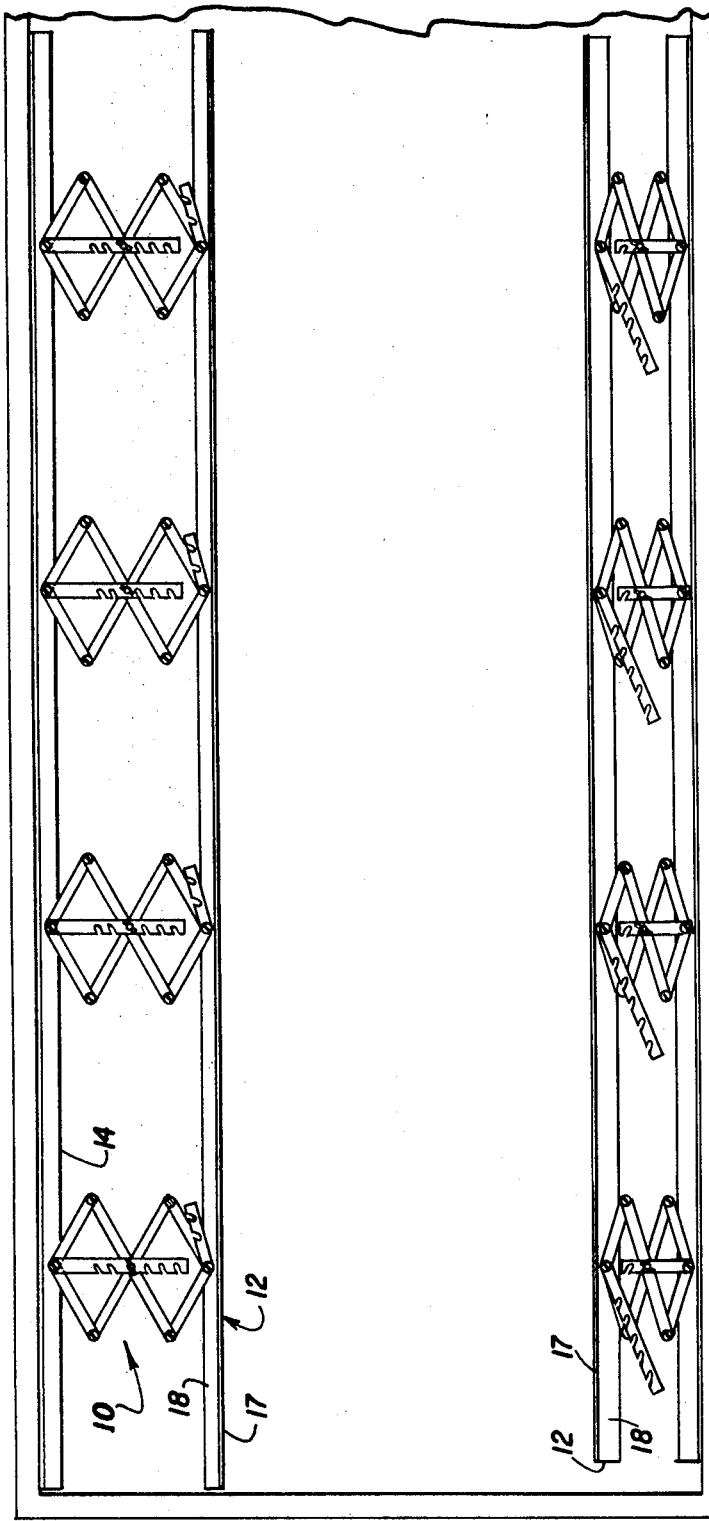
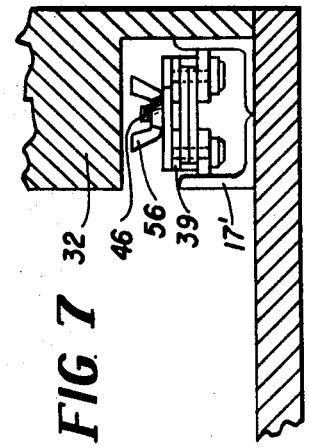
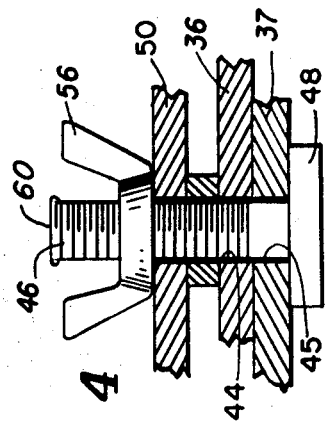
Inventor
BASIL GEORGE VERBICK
BY Irving Faber
ATTYS.

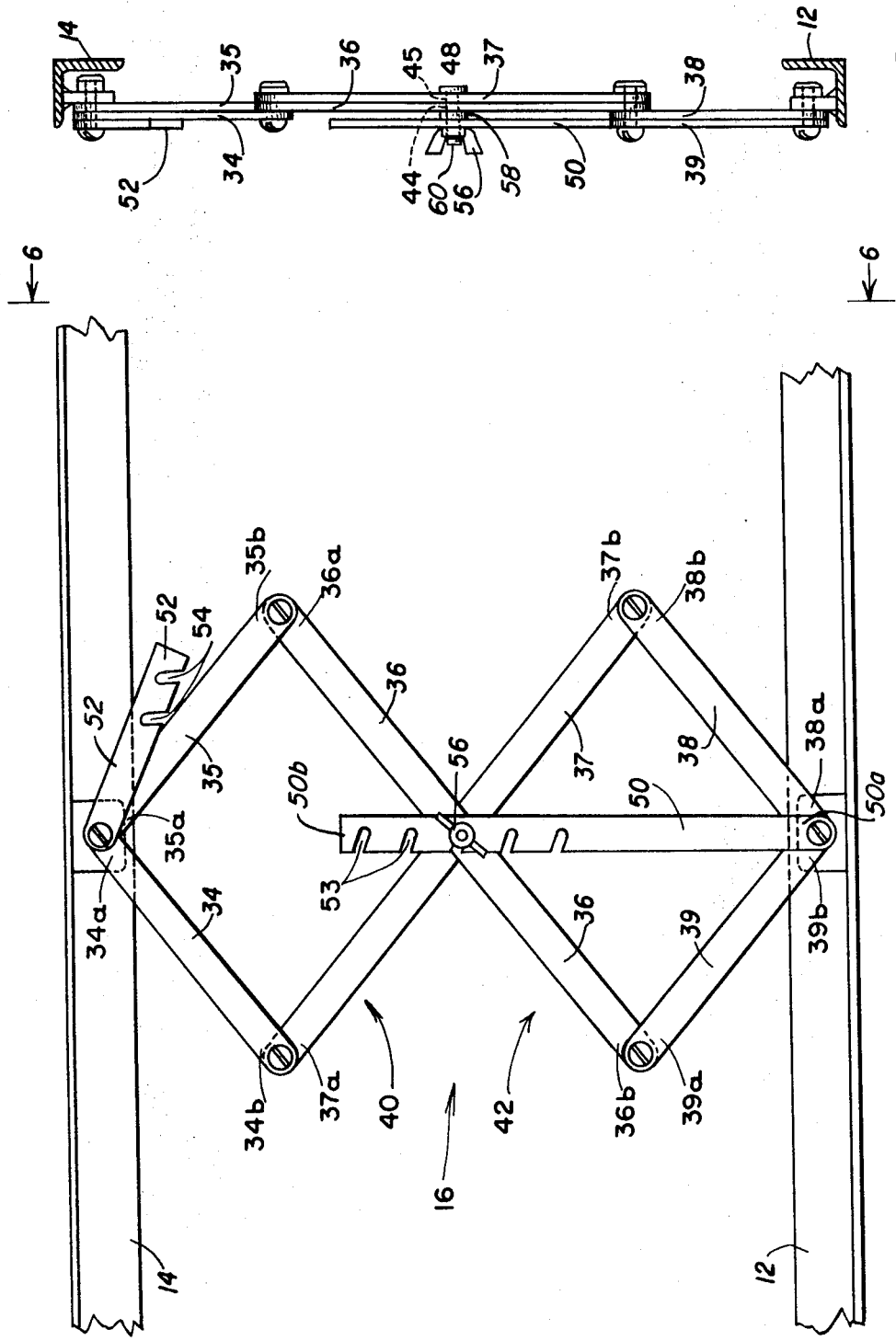

United States Patent Office

3,606,842
Patented Sept. 21, 1971

3,606,842
ADJUSTABLE RETAINER
Basil George Verbick, 7121 Arizona Ave.,
Hammond, Ind. 46323
Filed May 5, 1969, Ser. No. 821,633
Int. Cl. B61d 45/00
U.S. Cl. 105—369B    7 Claims

ABSTRACT OF THE DISCLOSURE

An adjustable retainer for inhibiting the lateral movement of freight within a freight carrying vehicle which comprises a pair of bracing members having adjustable means interposed therebetween. The adjustable means comprises a plurality of linkages pivotally coupled together to form a pair of parallelograms. Fixing members having a plurality of notches are pivotally coupled to the linkages and are suitable for engaging a bolt about which each of said parallelograms is expandable and contractable. One of said pair of bracing members is affixed to the freight carrying vehicle while the other of said pair of bracing members is expandable to abut the outer leg of a skid carrying the load. An adjustable retainer on each side of the load is necessary to adequately restrain lateral movement of the load.

BACKGROUND OF THE INVENTION

This invention relates generally to an apparatus which inhibits the lateral movement of cargo within a freight car or other freight bearing vehicles and more particularly to a new and novel means for laterally retaining concentrated loads such as machinery, coiled tin plate, sheet steel and the like.

Loading of machinery, sheet steel, tin plate, etc., into railroad freight cars, gondola cars and other freight bearing vehicles is governed by the American Association of Railroads who set forth loading techniques and requirements in pamphlets which they publish, in particular AAR pamphlets 21, 23 and 42D.

Heavy concentrated loads, such as heavy machinery, rolled sheet steel and tin plate, etc. are generally affixed to wooden skids and the loaded into the freight carrying vehicle. The average railroad car may carry a load between 100,000 pounds and 130,000 pounds; however, it is understood that heavy concentrated loads can be carried by other freight bearing vehicles such as trucks, planes and ships, each which would have its own maximum weight limitation and concentration. Heavy concentrated loads are permitted to float in a longitudinal (fore and aft) direction and are commonly known as floating loads. The loads are allowed to float in a longitudinal direction because it is very difficult to restrain the enormous forces generated by them. The heavy concentrated loads, that is, each unit within the freight carrying vehicle must be distributed equally throughout the vehicle to prevent over-concentration of load in one area of the vehicle and most important, to inhibit lateral movement of the load within the vehicle, which if it occurred, would turn the vehicle over on one of its sides. Usually, a floating load which is laterally secured will not cause the freight carrying vehicle to turn over.

Generally, wood spacers take up the lateral space in freight, carrying vehicles and equalize the distribution of heavy weight properly within said vehicles. For each loading of a freight bearing vehicle, a substantial amount of lumber, nails and man-hours are required to properly position the load in compliance with AAR pamphlet standards. The wood braces are positioned to abut the skids and not the loads affixed to the skids, thereby restraining lateral movement of the load within the freight carrying vehicle.

When the freight carrying vehicle reaches it destination, the wood braces and nails must be removed prior to unloading. After unloading the loose and broken wood braces and nails are removed.

Removal of old nails and cleaning the freight carrying vehicle after unloading not only consumes costly man-hours but increases the amount of time in which the vehicle is not in service; and for each hour the freight bearing vehicle is not in service it is not earning revenue. By eliminating the need to remove wooden braces and cleanout, the vehicle would be in service a greater percent of the time thereby producing more revenue.

Bracing means, other than wood, are known in the art, such prior devices being disclosed in U.S. Pats. 3,344,750; 3,327,645; 3,212,458; 3,333,553, known to the inventor. Devices such as represented in U.S. Pats. 3,333,553 are designed for bracing cargo by directly abutting the cargo, while the devices of Pats. 3,344,750, 3,327,645 and 3,212,458 are movable walls used as fillers within box cars to maintain the spacial position of boxed goods. These devices are not suitable for absorbing the lateral spacing in box-cars, gondolas or other freight carrying means for machinery, rolled tin plate, steel, etc.; said existing devices abutting the loads directly where the machinery, tin plate, steel, etc., are generally mounted on skids or the like. Abutment of the lateral retaining means against the heavy concentrated load will cause damage to the loads. There is no device known to the inventor, suitable for laterally restraining heavy loads in box cars, gondolas or the like except for the time consuming and expensive method of using wood braces and nails.

The American Iron and Steel Institute and the Association of American Railroads have for 15 years attempted to develop a device which would eliminate nailing down wood spacers to laterally restrain heavy concentrated loads, since there is no guarantee that wood blocking will withstand heavy concentrated weight within the vehicle due to extensive vibration while the vehicle is in motion.

The use of wood spacers to restrain lateral movement of heavy concentrated loads leads to numerous other problems, such as the correct size of nails and proper method of hammering nails. The nailing process is not only expensive, hazardous to personnel, injurious to the floor of the vehicle but requires time for cleaning out the wood and nails.

Inconvenience, time and expense are the trademarks of the present method of laterally restraining heavy loads within freight carrying vehicles.

SUMMARY OF THE INVENTION

The adjustable retainer embodying the invention includes means for laterally retaining heavy concentrated loads in railroad cars or other freight carrying vehicles; said means including a plurality of linkages pivotally coupled to form a pair of parallelograms, said parallelograms being pivotally coupled to one another and interposed between a pair of steel angles. One of the pair of steel angles abuts the skid carrying the load, while the other is affixed to a wall of the freight carrying vehicle or to its floor. The steel angle which is affixed to the freight carrying vehicle may also be recessed within a wall of the vehicle and there affixed to the wall and/or floor in a manner well known in the art.

The steel retainer can, better than the wood spacers presently used and described aforesaid, withstand the heavy concentrated weight within the freight carrying vehicle.

Another feature of the invention is that it ensures greater safety to the load while in transit and to personnel working in the freight carrying vehicle during loading and unloading because loose nails and broken wood members are eliminated.

Another feature of the invention is that it saves many man-hours because a foreman will not have to check the wood spacers and nailing to ensure that they comply with the necessary codes.

Still another feature of the invention is that the steel retainer is reusable as long as the freight carrying vehicle is in service.

Yet another feature is that the vehicle is kept clean because there is no need to tear the floor of it during removal of the wood braces and nails.

Still another feature is that clean out of the freight carrying vehicle is eliminated once the load has been removed.

Still a further advantage is that the shipper can load more vehicles in a day because the placing and nailing of wood braces is eliminated.

A further significant advantage of the invention is the relationship between the shipper and customer is strengthened since time is saved in loading and unloading the vehicle.

Yet another advantage is a reduction in claims since the chance of damage to the load is greatly reduced.

The foregoing and other significant advantages of the invention will become apparent from the ensuing disclosure in which a preferred embodiment is described in detail and illustrated in the accompanying drawings.

BRIEF DESCRIPTION OF THE DRAWINGS

FIG. 2 is a perspective view illustrating the invention retaining a heavy concentrated load in a gondola car.

FIG. 3 is a plan view illustrating the retainer in a cutaway freight carrying device.

FIG. 4 is a view in elevation of the retainer locking means.

FIG. 5 is a plan view of an expanded adjustable retainer embodying the invention.

FIG. 6 is a side elevational view of the expanded adjustable retainer taken along lines 6—6 in the direction indicated.

FIG. 7 is a side elevational view of the adjustable retainer in its non-expanded position positioned in a wall of a freight carrying device.

DESCRIPTION OF PREFERRED EMBODIMENT

Figure 1:
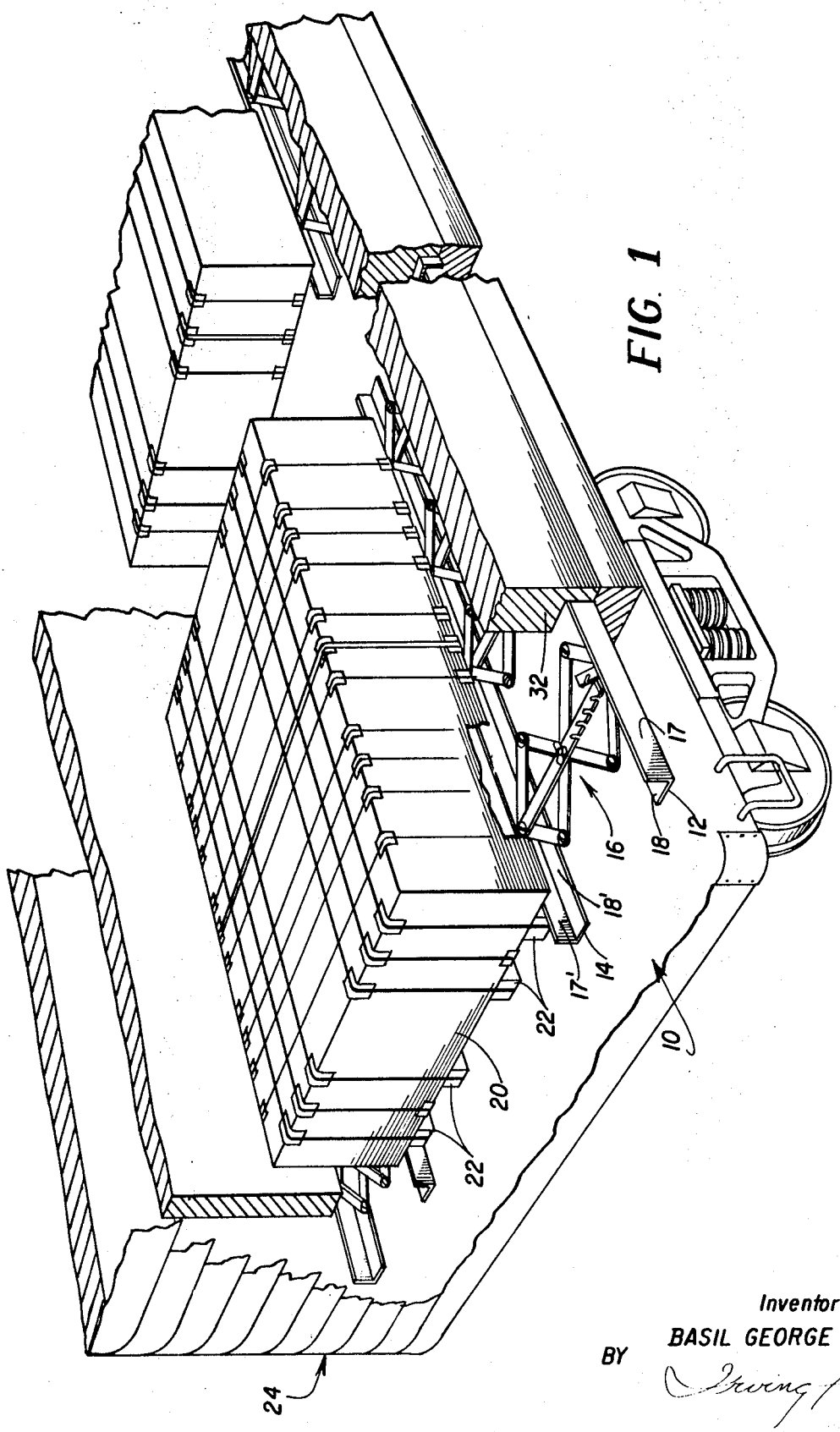
FIG. 1 is a cutaway view in perspective of a concentrated load in a freight car embodying the invention.

Referring to FIG. 1, the adjustable retainer embodying the invention is designated generally by the reference character 10. The retainer 10 is comprised of a first bracing member 12 and a second bracing member 14 having adjustable means 16 interposed therebetween to adjust said bracing members 12 and 14 relative to one another. The first and second bracing members 12 and 14 are preferably of steel stock in the form of an angle having sides 17, 18 and 17', 18' respectively. It is understood the materials other than steel may be used and that the scope of this invention is not limited to steel. A load 20 is coupled to a skid 22 and positioned within a freight carrying vehicle 24 of a type smiliar to a railroad box car.

FIG. 2 illustrates a particular type of freight carrying vehicle 24, a railroad gondola car, having a load 26 affixed to a skid 28 having legs 29 and 29'. The adjustable retainer illustrated in FIG. 2 is the same as that illustrated in FIG. 1 and has the same numerical designations. The side 17' of the second bracing member 14 is of a height slightly less than the height of the skid legs 29 so as to pass under that portion of the load 26 which laterally extends over the skid legs 29, 29' and abut said skid legs to laterally retain the load 26 within the freight carrying means 24. The load 26 is positioned within the freight carrying means 24 to obtain an equalization of weight within said freight carrying vehicle.

FIG. 3 illustrates the adjustable retainer 10 positioned on each side of one half of a freight car 30. The other side of the freight car 30, not shown, has an adjustable retainer on each side thereof making the number of retainers desirable for a freight car four in number. However, it is understood that any number of adjustable retainers can be used in a freight car or in any freight carrying vehicle to conform to the particular load which said freight carrying vehicle is used for.

The first bracing member 12 of the adjustable retainer 10 may be coupled to the floor of the freight carrying vehicle and/or to an inside wall as illustrated in FIG. 3. However, the adjustable retainer 10 can be recessed into a wall 32 of the freight carrying device as illustrated in FIG. 7; the first bracing member 12 being coupled to the floor and/or wall by means well known in the art.

The adjustable means 16 is best illustrated in FIG. 5 and is comprised of a plurality of linkages 34, 35, 36, 37, 38 and 39 pivotally coupled together to form a first and a second parallelogram 40 and 42, respectively. An aperture 44 is centrally disposed in linkage 36 and an aperture 45 is centrally disposed in linkage 37. The parallelograms are formed when one end 34a of linkage 34 is pivotally coupled to the second bracing member 14; the other end 34b being pivotally coupled to one end 37a of linkage 37. One end 35a of linkage 35 is pivotally coupled to the one end 34a of linkage 34 and the second bracing member 14; the other end 35b of linkage 35 is being pivotally coupled to one end 36a of linkage 36. Another end 36b of linkage 36 is pivotally coupled to one end 39a; the other end 39b being pivotally coupled to the first bracing member 12 and to one end 38a of linkage 38. The other end 38b of linkage 38 is pivotally coupled to the other end 37b of linkage 37. A threaded bolt or fixing stud 46 passes through apertures 44 and 45 having a head 48 adjacent linkage 37, as best illustrated in FIG. 4. The parallelograms 40 and 42, formed from the aforedescribed linkage couplings are expandable and contractable about the bolt 46 thereby adjusting the first or second bracing members 12 and 14 relative to one another. The pivot couplings of the linkages 34 through 39 are provided by means well known in the art.

A first fixing member 50 has an end thereof 50a pivotally coupled to the ends 38a and 39b of linkages 38 and 39 and to the first bracing member 12; the other end 50b of fixing member 50 has a plurality of notches 53 adjacent thereto and machined therein suitable for engaging bolt 46. A second fixing member 52 has an end 52a pivotally coupled to the ends 34a and 35a of linkages 34 and 35 respectively and to the second bracing member 14. The other end 52b has a plurality of machined notches 54 adjacent thereto suitable for engaging bolt 46. When either one of the plurality of notches 53 or 54 of fixing members 50 and 52 is engaged by bolt 46 the position of the first and second bracing members 12 and 14 is fixed relative to one another and said position is secured by a locknut 56 threaded on bolt 46 or otherwise secured thereto. When neither the first or second fixing members 50 and 52 are engaged by the threaded bolt 46 the first and second parallelograms 40 and 42 formed as herein stated can be expanded or contracted so that one of said bracing members can be positioned adjacent the skid to which the heavy concentrated load is affixed.

In operation, a load, such as illustrated in FIGS. 1 and 2 is positioned within a freight carrying vehicle, distributing the weight as evenly as possible. The adjustable retainer 10 has the first bracing member 12 affixed to the wall and/or floor of the freight carrying vehicle. The bracing member 12 may be recessed within the wall 32, as illustrated in FIG. 7 or it may be affixed to the wall and/or floor surfaces of the freight carrying vehicle. Affixing the bracing member 12 to the freight carrying vehicle may be effected by welding, bolting or other suitable fastening means well known in the art.

As stated hereinbefore, the loads are fixed to skids prior to their positioning within the freight carrying vehicle. Once the load is positioned within the freight carrying vehicle, the second bracing member is expanded to abut or otherwise be adjacent to the outer leg of the skid. An adjustable retainer 10 is positioned on each side of the load, as illustrated in FIGS. 1, 2 and 3; thereby inhibiting lateral movement of the load in transit while the load may float longitudinally. It is understood that any number of adjustable retainers may be used to laterally restrain movement of the load in transit; the specific number required being determined by the particular freight carrying vehicle and the positioning of the load therein.

The weight of the adjustable retainer 10 varies, depending on its size, the load limitations of the particular freight carrying vehicle and strength of the material necessary to laterally restrain the floating load in compliance with all applicable codes and regulations.

The positioning of notches 53 and 54 of fixing members 50 and 52 respectively can be machined so as to provide several incremental steps of minimum width when expanding or contracting the adjustable retainer 10 to abut the legs of the skid.

FIG. 6 illustrates the expanded adjustable retainer fixed in a set position. A bearing or sleeve 58 is positioned on bolt 46 to which fixing members 50 or 52 will abut when the adjustable retainer is in a fixed position. It is also understood that to prevent the lock nut 56 from being removed from an end 60 of the bolt 46, said end 60 may be flattened or, by other means well known in the art, fixed to prevent the nut 56 from being removed once it has been coupled to the bolt or fixing stud 46.

Any number of adjustable means 16 can be interposed between the bracing members 12 and 14, depending upon the length of said bracing members and the strength necessary to inhibit the lateral movement of the load.

When the freight carrying vehicle reaches its destination, the lock nut 56 is loosened on each of the adjusting means 16 and the second bracing member 14 is contracted away from the outer leg of the skid toward the bracing member 12. FIG. 7 illustrates bracing members 12 and 14 recessed in a wall 32 of a freight carrying vehicle. It is possible to have only one man loosen the nut 56 and contract bracing member 14 to the bracing member 12 to facilitate removal of the load as well as having one man expand member 14 to abut the outer leg of the skid carrying the load; thereby eliminating the costly and expensive method which is presently used. The lock nut 56 restrains the fixing members 50 and 52 from disengaging the stud 46 in transit.

The adjustable means 16 may have several configurations other than the forming of parallelograms by a plurality of linkages described above. One of such configurations, not illustrated is to use a plurality of tubing or conduits each one of said tubes or conduits having a diameter slightly less than the other enabling each of the plurality of tubes or conduits to slide one within the other. The slidability of the tubes, one within the other, with the opposite ends of the tubing coupled to the first and second bracing members respectively, would enable the first and second bracing members to be expanded or contracted relative to one another. The fixing means for said configuration could be by hydraulic means which would fix each of the plurality of tubes or conduits relative to one another at the desired expanded position as well as being suitable for contracting one of the bracing members to the other. Another method of fixing the tubes or conduits would be by using pins inserted between adjacent tubes until the desired expansion was obtained.

Another configuration would be to insert steel or wooden members of a predetermined length between said first and second bracing members having each end of said members attached to one of each of said first and second bracing members in a manner well known in the art. The predetermined length would be that length necessary to have one of the bracing members abut the leg of the skid carrying the load while the other bracing member is affixed to the freight carrying vehicle.

It is understood that various other configurations using linkages could be interposed between the first and second bracing members to obtain the necessary distance to fix one of the bracing members against or adjacent the skid leg while the other bracing member is fixed to the freight carrying vehicle.

It is believed that the invention has been described in sufficient detail so as to enable the skilled artisan to understand and practice the same. Minor variations in size, proportion and arrangement of parts thereof may be made without departing from the spirit and scope of the invention.

What is desired to be secured by Letters Patent of the United States is:

1. An adjustable retainer to inhibit the lateral movement of freight within a freight carrying vehicle having a floor and walls, said freight being mounted on a skid having legs, and said adjustable retainer comprising:
   a first bracing member positioned within and coupled to said vehicle adjacent the wall and floor of said vehicle;
   a second bracing member adjacent the floor of said vehicle and being of a size to enable it to abut the leg of a skid carrying the freight;
   adjustable means interposed between said first and second bracing members, said second bracing member being adjustable relative to the first bracing member, said adjustable means including a plurality of links pivotally coupled to form a first and second parallelogram, said parallelograms being pivotally coupled at a point which is centrally disposed between said first and second bracing members;
   a first fixing member coupled to said first parallelogram and said first bracing member having means for fixing the second bracing member relative to the first bracing member; and
   a second fixing member coupled to the second parallelogram and said second bracing member, said second fixing member having means for providing an additional plurality of positions for fixing the first and second fixing members relative to one another.

2. An adjustable retainer as defined in claim 1 wherein said adjustable means further includes:
   a fixing stud affixed to said first and second parallelograms where said parallelograms are pivotally coupled.

3. An adjustable retainer as defined in claim 1 wherein said means for engaging the fixing stud comprises a plurality of machined notches suitable for engaging said stud.

4. An adjustable retainer to inhibit the lateral movement of a floating load within a freight carrying vehicle having a floor, said load being affixed to skids having legs, said adjustable retainer comprising:
   a first bracing member coupled within said vehicle;
   a second bracing member adjacent the floor of said vehicle suitable for abutting the legs of said skid and not contacting said load directly;
   means for locking said first and second bracing member in a fixed position;
   adjustable means interposed between said first and second bracing members, said means including a plurality of links pivotally coupled together to form a pair of parallelograms, one of said parallelograms being coupled to said first bracing member and the other of said pair of parallelograms being coupled to said second bracing member, said parallelograms being pivotally coupled to each other about a stud, said stud being disposed between said first and second bracing member;
   a first fixing member pivotally coupled to said first bracing member and to said one of said pair of parallelograms having means for fixing the second bracing member relative to the first bracing member; and a second fixing member pivotally coupled to said second bracing member and to the other of said pair of parallelograms, said second fixing member having additional means for fixing the first and second bracing members relative to one another.

5. An adjustable retainer as defined in claim 4, wherein said means for fixing the second bracing member relative to the first bracing member comprises a plurality of notches.

6. An adjustable retainer as defined in claim 5 wherein said locking means further includes a lock nut engaging said stud whereby the lock nut restrains the fixing members from vibrating out of engagement with the stud during transit.

7. An adjustable retainer as defined in claim 6 wherein said first and second parallelograms are expandable and contractable about said locking means.

References Cited

UNITED STATES PATENTS

| | | | |
|---|---|---|---|
| 1,627,559 | 5/1927 | Haul | 248—277X |
| 2,009,918 | 7/1935 | Grassi | 297—345 |
| 2,114,914 | 4/1938 | Davis | 248—277X |
| 2,387,902 | 10/1945 | Hedges | 105—367 |
| 2,424,395 | 7/1947 | Hedges | 105—367 |
| 2,749,969 | 6/1956 | Tatter | 248—277X |
| 3,333,553 | 8/1967 | Krokos | 105—369(B) |
| 3,472,180 | 10/1969 | Loomis | 105—369(.2) |

DRAYTON E. HOFFMAN, Primary Examiner

U.S. Cl. X.R.

105—369S, 369U